United States Patent
Barbaresi et al.

(10) Patent No.: US 8,339,946 B2
(45) Date of Patent: Dec. 25, 2012

(54) METHOD AND SYSTEM FOR CONTROLLING THE ALLOCATION OF SERVICES IN A COMMUNICATION NETWORK, AND CORRESPONDING NETWORK AND COMPUTER-PROGRAM PRODUCT

(75) Inventors: Andrea Barbaresi, Turin (IT); Marco Tosalli, Turin (IT); Javier Leonardo Quijano Araque, Turin (IT)

(73) Assignee: Telecom Italia S.p.A., Milan (IT)

( * ) Notice: Subject to any disclaimer, the term of this patent is extended or adjusted under 35 U.S.C. 154(b) by 616 days.

(21) Appl. No.: 11/922,923

(22) PCT Filed: Jun. 30, 2005

(86) PCT No.: PCT/EP2005/007076
§ 371 (c)(1),
(2), (4) Date: Feb. 12, 2009

(87) PCT Pub. No.: WO2007/003207
PCT Pub. Date: Jan. 11, 2007

(65) Prior Publication Data
US 2009/0303940 A1 Dec. 10, 2009

(51) Int. Cl.
*H04L 12/26* (2006.01)
(52) U.S. Cl. ........................................................ 370/230
(58) Field of Classification Search .................. None
See application file for complete search history.

(56) References Cited

U.S. PATENT DOCUMENTS

| 7,307,961 B2 * | 12/2007 | Radpour ........................ 370/252 |
| 2002/0041566 A1 * | 4/2002 | Yang et al. .................... 370/229 |
| 2004/0010582 A1 | 1/2004 | Oliver |
| 2004/0136321 A1 * | 7/2004 | Ren et al. ...................... 370/230 |

(Continued)

FOREIGN PATENT DOCUMENTS

CN 1368827 A 9/2002

(Continued)

OTHER PUBLICATIONS

3GPP TR25.881, V5.0.0, $3^{rd}$ Generation Partnership Project; Technical Specification Group Radio Access Network, "Improvement of RRM Across RNS and RNS/BSS," (Release 5), pp. 1-44, (2001).

(Continued)

*Primary Examiner* — Chirag Shah
*Assistant Examiner* — Amar Persaud
(74) *Attorney, Agent, or Firm* — Finnegan, Henderson, Farabow, Garrett & Dunner, L.L.P.

(57) ABSTRACT

The provision of services to the users of a multi-resource communication network is controlled by modelling the system made up of these resources as a Markov chain, wherein each state of the Markov chain is identified by a respective set of values of the numbers of the users served by each of the resources, and the transitions between states are represented by the allocation and de-allocation to the users of the services provided by the resources. A cost function is defined wherein each of the states gives a respective contribution weighted by the probability that the Markov chain is in that state, such probability being a function of the possible transitions between the states. A plurality of transitions between the states is thus identified that optimizes the cost function, and the resources are allocated to the users according to such plurality of transitions that optimizes the cost function.

18 Claims, 9 Drawing Sheets

U.S. PATENT DOCUMENTS

2004/0203732 A1* 10/2004 Brusilovsky et al. ...... 455/426.1
2008/0239951 A1* 10/2008 Strom ........................... 370/230
2009/0017823 A1* 1/2009 Sachs et al. ................... 455/437

FOREIGN PATENT DOCUMENTS

| WO | WO 02/32160 A2 | 4/2002 |
|---|---|---|
| WO | WO 2004/056041 A1 | 7/2004 |
| WO | WO 2006/007415 A2 | 1/2006 |

OTHER PUBLICATIONS

3GPP TR25.891, V0.3.0, $3^{rd}$ Generation Partnership Project; technical Specification Group Radio Access Network; "Improvement of RRM Across RNS and RNS/BSS," (Release 6), pp. 1-17, (2003).

3GPP TR 23.934, V1.0.0, $3^{rd}$ generation Partnership Project; Technical Specification Group Services and System Aspects; "3GPP System to Wireless Local Area Network (WLAN) Interworking—Functional and Architectural Definition," (Release 6), pp. 1-37, (2002).

ETSI TR 101.953-2-3, "Access Network xDSL Transmission Filters; Part 2: VDSL Splitters for European Deployment; Sub-part 3: Specification of Testing Methods for VDSL/ISDN Splitters," pp. 1-30, (2004).

S. Kalyanasundaram et al., "Optimal Resource Allocation in Multi-class Networks with User-specified Utility Functions," Computer Networks, vol. 38, No. 5, pp. 613-630 (Elsevier Science Preprint).

D.L. Isaacson et al., "Continuous-Time Markov Chains," Markov Chains—Theory and Applications, John Wiley & Sons, chap. 7, pp. 229-249, (1976).

Barbaresi et al., Everest IST-2002-001858, "First Report on the Evaluation of RRM/CRRM Algorithms," pp. i-ix and 1-252, (2004).

S. Kalyanasundaram et al., "Optimal Resource Allocation in Multi-class Networks with User-specified Utility Functions," Computer Networks, vol. 38, No. 5, pp. 613-630 (2002).

Written Opinion of the International Search Authority mailed from the European Patent Office in counterpart International Application No. PCT/EP2005/007076, filed Jun. 30, 2005 (5 pages).

* cited by examiner

METHOD AND SYSTEM FOR CONTROLLING THE ALLOCATION OF SERVICES IN A COMMUNICATION NETWORK, AND CORRESPONDING NETWORK AND COMPUTER-PROGRAM PRODUCT

CROSS REFERENCE TO RELATED APPLICATION

This application is a national phase application based on PCT/EP2005/007076, filed Jun. 30, 2005, the content of which is incorporated herein by reference.

FIELD OF THE INVENTION

The present invention relates to techniques for the management of radio resources.

In particular, the invention is applicable to Common Radio Resource Management (CRRM) techniques, which, in a "heterogeneous" mobile-radio network, i.e., a mobile-radio network that can support technologies of different types, enable joint management of the radio resources.

DESCRIPTION OF THE RELATED ART

In the field of mobile-radio networks, there exist different technologies and numerous standards. The mobile-radio networks that are currently most widespread (the so-called second-generation ones, such as, for example, the GSM system) are already flanked and will, in future, be increasingly flanked by new-generation mobile-radio networks (for example, third-generation ones, such as the UMTS system, or fourth-generation ones, which are still undergoing definition) and by broadband networks of the Wireless-LAN (WLAN) type. Second-generation mobile-radio networks are more suitable for supporting the voice service, whilst new-generation mobile-radio networks (for example, third-generation and fourth-generation ones) are designed for supporting, in addition to the voice service, also a series of services of data and multimedia type.

Within this context, a tendency of the market is not to replace completely the second-generation mobile-radio networks already operating with the new-generation mobile-radio networks, but to integrate the two types of networks. The integration between new-generation mobile-radio networks and second-generation mobile-radio networks is made possible by the characteristics of the new standards, defined in such a way as to enable this integration. Within the 3GPP standard, which defines the characteristics of third-generation systems, such as the UMTS system, for example, different procedures are specified that allow to interwork with the GSM network.

In particular, in the documents 3GPP TR25.881, "Improvement of RRM across RNS and RNS/BSS, Release 5" and 3GPP TR25.891, Improvement of RRM across RNS and RNS/BSS, Release 6" the functional models and the network architectures within which the CRRM techniques find application are defined.

Another market trend is to use within well-determined regions of territory—the so-called "hot-spots"—the WLAN (Wireless Local Area Network) technologies in order to enable the users present in these regions to gain broadband access to a series of telecommunication services, e.g., access to the Internet). WLAN technologies can also be integrated within a mobile-radio network, in particular in the access network segment.

For this reason, in the definition of the specifications of the different systems, whether mobile-radio ones or WLAN ones, a series of activities are in progress aimed at defining the most appropriate interworking mechanisms among these systems, also enabling the use of WLAN technologies (e.g., IEEE 802.11 or else HYPERLAN2) for accessing to the third-generation transport mobile-radio network. The document TR 23.934, "3GPP system to Wireless Local Area Network (WLAN) Interworking—Functional and architectural definition, Release 6" of the 3GPP standard, for example, specifies the functional requirements that should be met by the various network architectures that include the WLAN accesses belonging to the IEEE 802.11 family in the UMTS system. Likewise, the document TR 101.953 of the ETSI standard specifies the interworking mechanisms with the UMTS network of the standard of a WLAN broadband type, referred to as HYPERLAN2.

For the reasons set forth above, mobile terminals, such as for example cellphones, palm-top computers, PDAs, connectivity cards for personal computers, etc. are already commercially available, which are referred to as "multi-mode" mobile terminals, because they are not limited to operate with a single network, following just one standard, but can use indifferently various systems belonging to different standards. An example in this sense is provided by multi-mode terminals that are already today able to manage indifferently the GSM, UMTS and WLAN 802.11b standards.

Specified in the various standards cited above are only the architectures, procedures and mechanisms for the interworking of the different systems with one another, including therein the initial selection of what system to use at the moment of a service request. When a certain type of service is requested which, on account of its characteristics, can be supplied indifferently through different access systems (GSM, UMTS or WLAN) a network operator can thus select which system to use by exploiting these mechanisms.

For example, in WO-A-02/32160 a technique for determining cell allocation in a network supporting different communication standards is described.

The Applicant has noted that this technique is not particularly efficient in the maximization of the performance of a multi-access network. In fact, it is based only upon the association of a different level of priority to the cells of the various systems, without taking into account the fact that in the cell different traffic situations may thus arise in time that do not enable assignment of the network resources in a dynamic and efficient way according to the state of the different systems.

In Kalyanasundaram S., Chong E. K. P., Shroff N. B., "Optimal resource allocation in multi-class networks with user-specified utility functions", Computer Networks, vol. 38, No. 5, pp. 613-30, the problem is considered of resource allocation in multi-service networks, where users specify the value they attach to obtaining different amounts of resource by means of a utility function. A resource allocation scheme is developed that maximizes the average aggregate utility per unit time. This resource-allocation problem is formulated as a Markov decision process. Implications of deliberate lying by users about their utility functions are also discussed and a pricing scheme that prevents such lying is developed.

PURPOSE AND SUMMARY OF THE INVENTION

For a network operator managing a multi-access network, for example one comprising GSM and UMTS technologies and WLAN hot-spots, there arises, however, the problem of using all these technologies in a coordinated and synergistic way so as to provide the service requested, thus maximizing the overall efficiency and the exploitation of the entire multi-access network. In particular, for a network operator, it is expedient to define the CRRM policy, which will establish, each time and according to the type of service requested by the user, the most suitable system to use and what criterion to apply to achieve the efficiency targets set.

The solution described herein defines an "automatic" method, based upon an analytical process, which in the presence of a new service request, is able to identify the choice to be made (in terms of maximization of the global performance of the multi-access network), i.e., which access networks available can be used to provide the service, according to at least the following parameters:

the state of the entire multi-access network, in terms of occupation of the radio resources and their assignment for the services in progress;

the type of service requested;

the frequency of arrival at the network of new service requests; and the mean duration of the services.

Furthermore, in the case of optimization of the revenue, another parameter usable is represented by the values that can be attributed to each service. In greater detail, the solution described herein, is based upon the definition of a mathematical model of the multi-access network according to a representation that uses Markov chains. In this case, such chains are not, however, rigidly defined, but conserve many degrees of freedom, corresponding to the possible policies of assignment of the resources. The solution, through an iterative procedure, defines the value to assign to the free variables in order to optimize the index of performance chosen (e.g. the blocking probability or the revenue).

The common-management policies derived by means of the solution described herein prove to be more efficient than the known ones, because the choices of allocation made each time a new service request arrives are all aimed, for example, at minimizing (in overall mathematical terms) the overall blocking probability or else at maximizing (once again in overall mathematical terms) the revenue for the operator.

Since the solution described herein identifies the policy of management of the radio resources with the aim of optimizing the overall performance, the resulting rules can then also envisage that, in certain given situations, the network refuses to meet a request that reaches it, albeit having at that moment sufficient available resources. This circumstance can arise, for example, when the network is found almost at the maximum limit of use of the resources; in such cases, in fact, the preventive blocking of a specific service request (for example, a data request) that reaches the network can enable the few network resources still available to be left free to give the possibility of serving a greater number of requests of other types of service (for example, voice requests).

There may also arise situations in which, at a given instant, it proves convenient to assign one and the same type of requests to one system (e.g., GSM) or else to another (e.g., UMTS), albeit in the presence of free resources on both of the systems. Also in such cases, in fact, choosing one system or else an alternative system can affect the overall performance.

According to the present invention, the above object is achieved by means of a method having the features set forth in the ensuing claims. The invention also relates to a corresponding system, as well as to a corresponding network and computer-program product, which can be loaded into the memory of at least one computer and includes portions of software code for performing the steps of the method of the invention when the product is run on a computer. As used herein, reference to such a computer-program product is understood as being equivalent to reference to a computer-readable medium containing instructions for controlling a computer system to co-ordinate the performance of the method of the invention. Reference to "at least one computer" includes a network apparatus and/or the possibility for the present invention to be implemented in a distributed/modular fashion.

The claims form an integral part of the disclosure of the invention provided herein.

In the currently preferred embodiment, the provision of services to the users via the resources of a multi-resource communication network is controlled by:

modelling a system made up of said resources of said communication network as a Markov chain, wherein each state of said Markov chain is identified by a respective set of values, each set of values being representative of a number ($n_{GSM}$, $n_{UMTSv}$, $n_{UMTSd}$, $n_{WLAN}$) of users served by each of said resources, and each transition between said states of said Markov chain being represented by the allocation and de-allocation to said users of the services provided by said resources;

defining a cost function to which each of said states gives a respective contribution, each of said contribution being weighted by the probability that said system is in said state, where said probability is a function of the possible transitions between said states;

identifying a plurality of transitions between said states that optimizes said cost function; and allocating said resources to said users according to said plurality of transitions.

BRIEF DESCRIPTION OF THE ANNEXED DRAWINGS

The present invention will now be described, purely by way of non-limiting example, with reference to the figures of the annexed plate of drawings, in which.

DETAILED DESCRIPTION OF A PREFERRED EMBODIMENT

Figure 1:
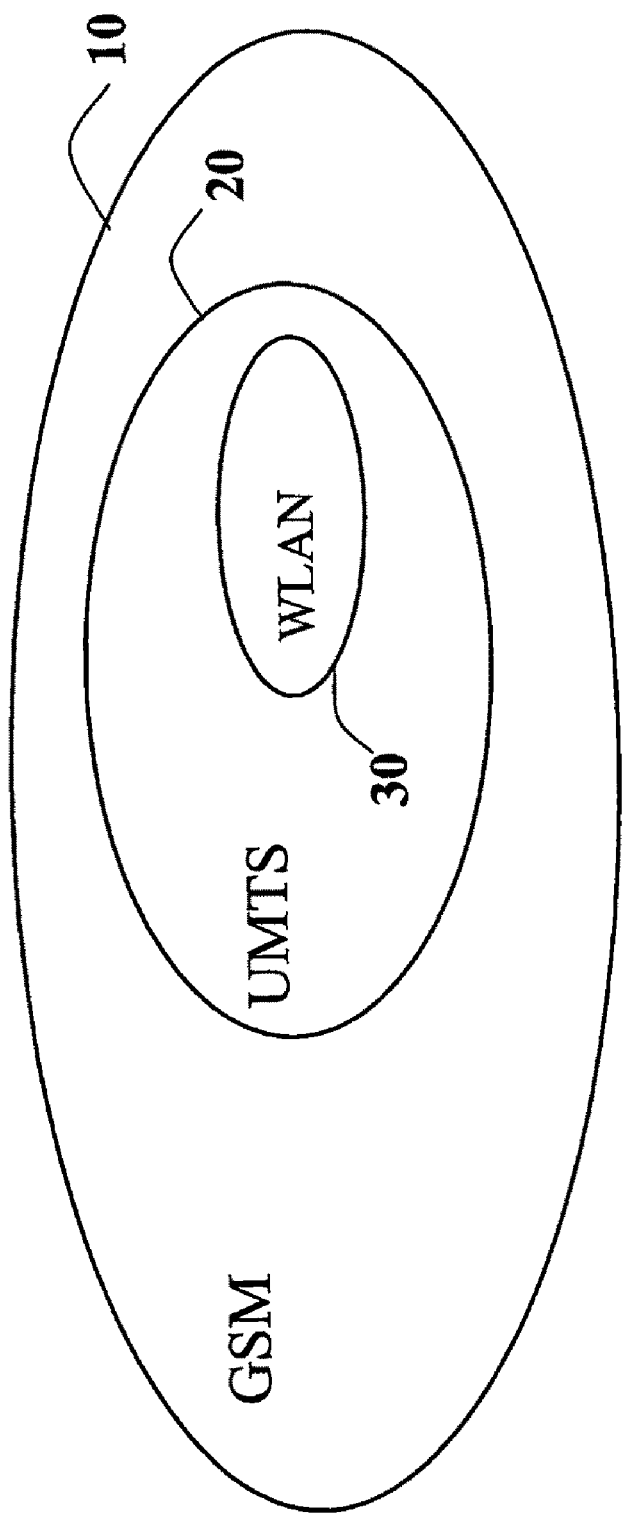
FIG. 1 shows an example of reference scenario of the techniques of allocation of the type described herein.

A possible scenario of application of the CRRM policies for service allocation on a multi-access network is illustrated in FIG. 1.

In particular, in FIG. 1, which exemplifies cases of interest treated herein, a region of territory 10 is served through the GSM mobile-radio network, and a subset 20 of that region is served also by the UMTS mobile-radio network (it will in fact be appreciated that the area covered by the access segment of the UMTS network will be at most coincident with that of the GSM network). Also considered is the presence of one or more limited areas of territory 30, in which the services are offered through a WLAN system (areas known as "hot-spots", such as for example airports, stadiums, small urban centers, hotels, commercial centers, buildings, etc.). In the cases of practical interest, said areas are usually located within the region served also by the cells of the UMTS network, given that their use is envisaged in all those cases characterized by the presence of a high concentration of users with low mobility who require services of a data type.

Figure 2:
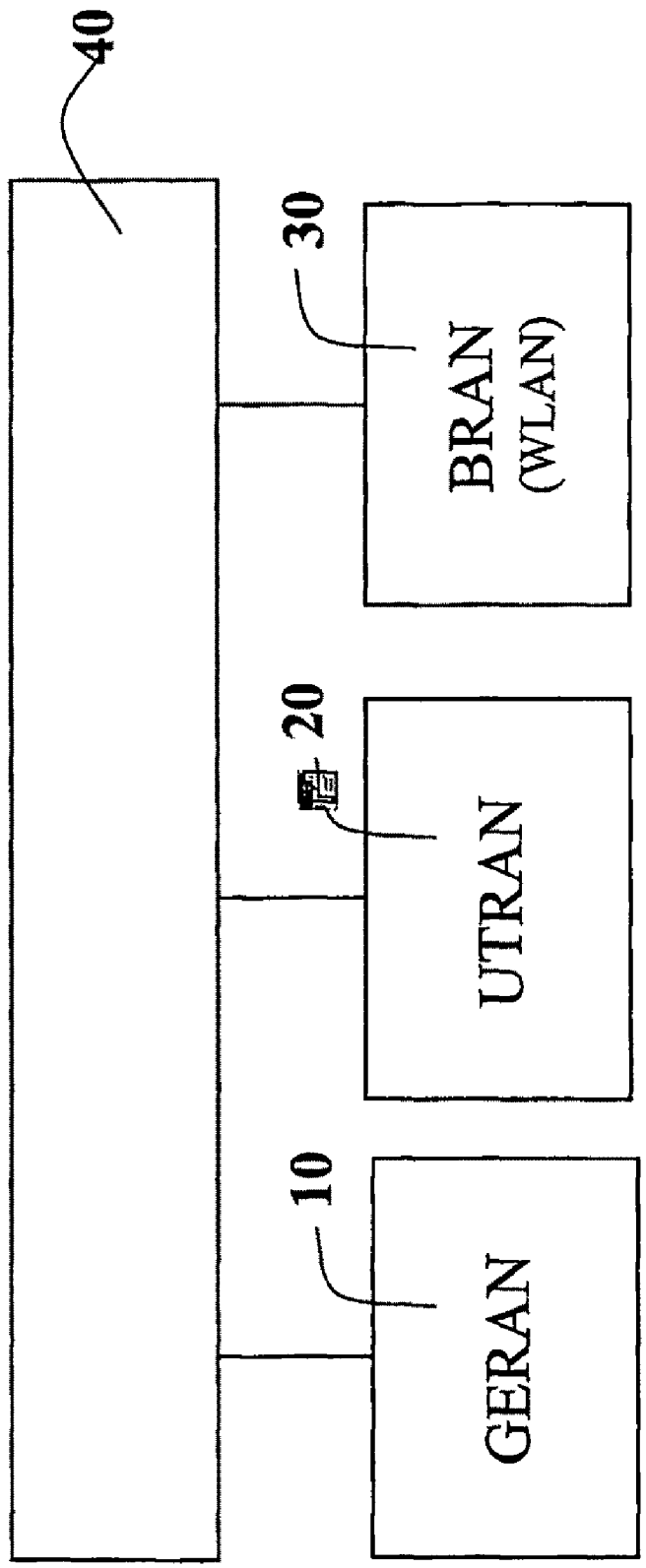
FIG. 2 shows an example of structure of a multi-access network within which the method described herein finds application.
Figure 3:
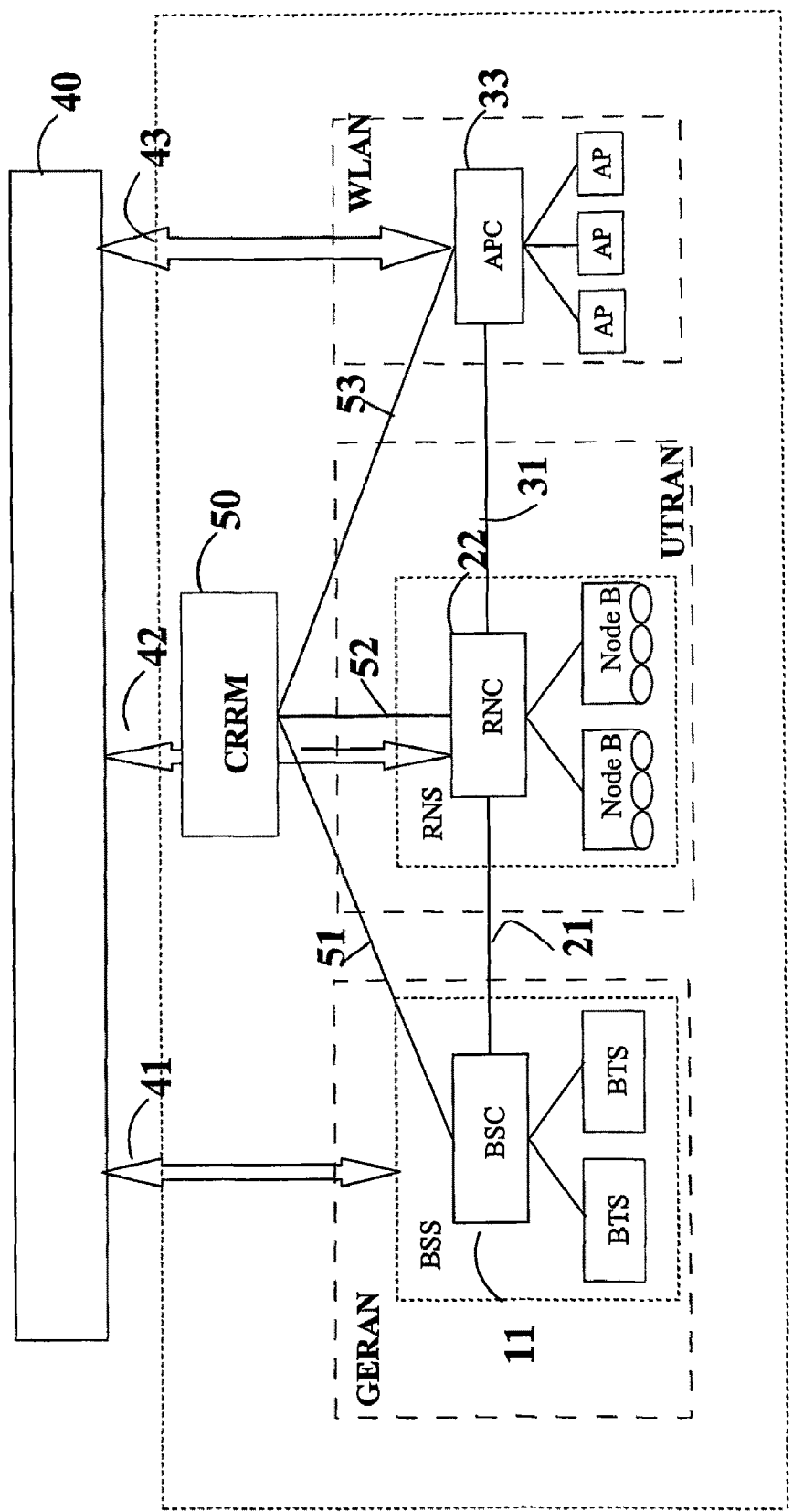
FIG. 3 shows an example of possible network architecture within which the method described herein finds application.

The network architecture within which the policy of resource allocation identified by the solution described herein can find application is represented in FIG. 2 and, in greater detail, in FIG. 3.

With reference to FIGS. 2 and 3, the architecture envisages the presence of an access network 10 of a GERAN (GPRS-EDGE Radio Access Network) type, used by the GSM/GPRS/EDGE systems, an access network 20 of a UTRAN (Universal Terrestrial Radio Access Network) type, used by the UMTS system, and an access network 30 of a BRAN (Broadband Radio Access Network) type, used by WLAN systems. It will be appreciated that, for reasons of simplicity, the same reference numbers 10, 20, and 30 have been used for distinguishing both the territorial areas mentioned previously and the access systems that serve them.

A transport segment 40 (3G Core Network) of the multi-access network 10, 20, 30 is interconnected with the GERAN access network 10 through an interface 41 (called interface "A" or else interface "Gb" according to the core network domain to which it is connected), with the access network UTRAN 20 through an interface 42 (corresponding to the Iu interface), and with the BRAN (WLAN) access 30 through an interface 43 (in many cases called Iu-like interface).

A network device 11 that controls the radio resources of the GSM system, known as BSC (Base Station Controller), a network device 22 that controls the radio resources of the UMTS system, known as RNC (Radio Network Controller), and a network device 33 that controls the access points to the WLAN network, known as APC (Access Point Controller), can exchange information through the transport segment 40, also known as Core Network.

Alternatively, the network device 11 that controls the radio resources of the GSM system, the network device 22 that controls the radio resources of the UMTS system, and the network device 33 that controls the access points to the WLAN network can communicate directly through an interface 21 (corresponding to the Iur interface) and an interface 31 (in many cases called Iur-like interface).

The CRRM technique generated by the solution described herein, can reside and be executed within the network device 11 that controls the radio resources of the GSM system, the network device 22 that controls the radio resources of the UMTS system, and the network device 33 that controls the access points to the WLAN network. Alternatively, it can reside and be applied within a network entity 50 specifically assigned to the CRRM of the multi-access network, known as CRRM Server, illustrated in FIG. 3.

The CRRM Server entity 50 can request information on the GSM cells from the network device 11 that controls the radio resources of the GSM system through an interface 51, on the UMTS cells from the network device 22 that controls the radio resources of the UMTS system through an interface 52, and on the WLAN hot-spots from the network device 33 that controls the access points to the WLAN network via an interface 53 (for the moment the type of interfaces has not been specified in the standards). Both the architecture that envisages distribution of the parts of CRRM in the individual network controllers (BSC 11, RNC 22 and APC 33) and the architecture of FIG. 3, in which the CRRM Server entity 50 is present, are suitable for supporting a generic CRRM technique.

As a whole, in the scenario described, real-time services of different types are considered. For this type of services, in fact, it is important for the network to guarantee a well-defined quality profile, which cannot vary in time, and hence, if the network does have not the resources to be able to supply the service requested with the appropriate level of quality, it is preferable for the new requests for that service to be blocked. By way of example, together with the classic voice service, it is also possible to hypothesize the presence of one or more data services of a real-time type, such as, for example, a video-phone call (data service belonging to CONVERSATIONAL class) or the exploitation of multimedia content supplied by a network server (data service belonging to STREAMING class).

According to the specific type, each service can be allocated on one or more access networks that constitute the multi-access network. The voice service, for example, can be offered via the GSM network or the UMTS network, whilst a generic data service can be offered via the UMTS network or the WLAN network.

The solution described herein enables identification of a CRRM policy which, in the presence of the possible service requests determines, for each state of the system, whether to accept or refuse the request and which access system to use to offer the service.

The solution described herein is founded on the modelling of the multi-access network by means of a continuous-time Markov chain (CTMC). In the course of the present description the designation continuous-time Markov chain will be used to designate "a model of sequences of events where the probability of an event occurring depends upon the fact that a preceding event has occurred". For a mathematical definition of a CTMC it is possible, for example, to consult D. L. Isaacson and R. W. Madsen "Markov chains—Theory and Applications", John Wiley & Sons, 1976, chap. 7, pp. 229-249.

A second element of the solution described herein is represented by the choice of the cost function to be optimized (e.g. the blocking probability or the revenue deriving from the supply of the services).

The solution described herein takes concrete form in the implementation (via the system elements illustrated in FIGS. 2 and 3) of an optimal CRRM policy by means of a technique that envisages alteration of the CTMC, based upon the gradient of the cost function that has been chosen.

There now follows a description of modelling of the multi-access network by means of a continuous-time Markov chain.

Consider, by way of example, a system constituted by a GSM cell, a UMTS cell and a WLAN hot-spot with partially overlapping coverages (see FIG. 1) and users which require two different real-time services: a voice service and a generic data service. In the example presented herein, it is supposed for reasons of simplicity, without any loss of generality, that there are just two services: the voice service, together with just one type of data service.

As regards the three radio access systems, the following constraints are considered:
- GSM: usable only for voice calls;
- UMTS: usable both for voice calls and for data calls; and
- WLAN: usable only for data calls.

As regards the two services offered, the following constraints are considered:
- some voice requests can be served only by the GSM cell (GSM-only voice requests);
- some voice requests can be served both by the GSM cell or the UMTS cell (GSM/UMTS voice requests);
- some data requests can be served only by the UMTS cell (UMTS-only data requests);
- some data requests can be served both by the UMTS cell or the WLAN hot-spot (UMTS/WLAN data requests).

Assuming the presence of the constraints described above, it is possible to define the N states of the multi-access network through the following quadruple:

$(n_{GSM}, n_{UMTSv}, n_{UMTSd}, n_{WLAN})$ where:
$n_{GSM}$ designates the number of voice calls in progress inside the GSM cell;
$n_{UMTSv}$ designates the number of voice calls in progress inside the UMTS cell;
$n_{UMTSd}$ designates the number of data calls in progress inside the UMTS cell; and
$n_{WLAN}$ designates the number of data calls in progress inside the WLAN hot-spot.

To model the behaviour of the multi-access network through a continuous-time Markov chain in which the generic state is constituted by the preceding quadruple, also the maximum number of users of each service that can be managed with the radio resources made available by the individual access systems is specified.

In the case of the GSM cell, the maximum number of voice users is represented simply by the number of circuits managed by the cell.

In the case of the WLAN hot-spot, it is possible, instead, to hypothesize that there is a maximum number of data users beyond which the WLAN access is no longer able to guarantee the profile of quality of service requested by the service. In the practical cases, said maximum number of users can be identified by the persons skilled in the field, for example considering the specific WLAN technology involved (e.g., IEEE 802.11b) and the throughput requested by the considered data service (setting, for example, a minimum limit for the transfer speed of the data that it is intended to offer to each users, or alternatively a limit to the maximum tolerable transfer delay).

Likewise, in the case of the UMTS cell, the different combinations constituted by the maximum number of voice and data users (service mix) that the cell can manage with the radio resources available are considered. As a whole, said combinations identify the "capacity region" of the cell.

In general terms, the capacity region can be defined uniquely by means of the function $Cd(n_v)$, which expresses the maximum number of data users acceptable by the system in the presence of $n_v$ voice users, and its inverse $CV(n_d)$, which expresses the maximum number of voice users acceptable by the system in the presence of $n_d$ data users.

Figure 5:
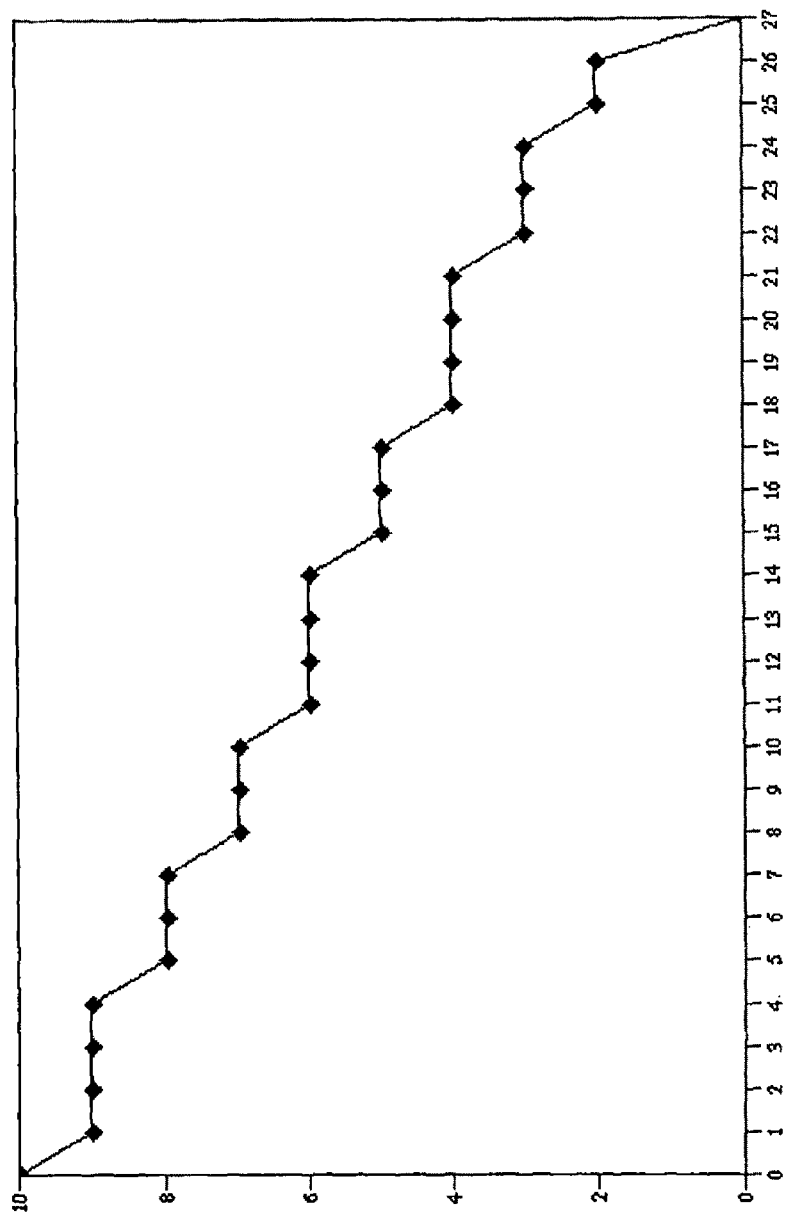
FIG. 5 shows an example of capacity region for a UMTS system in the case of two services: voice and data.

In practical cases, the functions Cd( ) and Cv( ) that constitute the capacity region of a specific UMTS cell can be identified by persons skilled in the sector, considering the profile of quality of service requested by the services considered and the amount of radio resources made available by the cell. A possible example of capacity region for a cell of the UMTS system, which has to manage the voice service and the data service of a streaming type at 16 kbit/skbit/s in the uplink and 128 kbit/skbit/s in the downlink is illustrated in FIG. 5, where given on the axis x is the number of voice users ($n_v$) and on the axis y the number of data users ($n_d$). The boundary of the capacity region (represented by the curve illustrated in FIG. 5) corresponds to the limit beyond which the cell is no longer able to accept further users; each of its points, then, represents the optimal traffic mix, in which the cell works at full load. Instead, underneath the curve, the cell would be under-used, since it is possible to allocate other users, on the basis of free available radio resources. In the case of the multi-access network, it should be considered that, in addition to the UMTS cell that is able to manage both voice users and data users, also the GSM cell and the WLAN hot-spot are present. It is therefore possible to determine a corresponding joint "capacity region" as for example described in the deliverable D11 of the project IST "EVEREST" available on the Internet for download via the URL: http://www.everest-ist.upc.es (at the filing date of the present patent application), section "public documents", document "First report on the evaluation of RRM/CRRM algorithms".

In general terms, on the basis of the considerations made, the capacity limits of the three access systems considered can be represented through the following relations:

$$0 \leq n_{GSM} \leq \text{GSMcap}$$

$$0 \leq n_{UMTSv} \leq Cv(n_{UMTSd})$$

$$0 \leq n_{UMTSd} \leq Cd(n_{UMTSv})$$

$$0 \leq n_{WLAN} \leq \text{WLAMcap}$$

where:
GSMcap indicates the total number of voice channels in the GSM cell;
Cd( ) and Cv( ) are the functions that describe the capacity region of the UMTS; and
WLANcap is the maximum number of data sessions allocable on the WLAN hot-spot.

According to the values assigned to the quantities just described and to the capacity region considered for the UMTS cell, the multi-access network is then represented by a continuous-time Markov chain formed by a certain number N of states.

As regards the possibility of evolution of the system, it is hypothesized that the traffic offered to the multi-access network is made up of the following four types:
voice requests that can be served only by GSM: the requests are characterized by inter-arrival times that are assumed as being distributed exponentially (this is a very common hypothesis in the field of engineering of the traffic in telecommunications in so far as it describes in a likely way phenomena characterized by the absence of memory, i.e., phenomena for which what happens does not depend upon what has happened previously) with average arrival frequency $\lambda_G$; the calls duration is also assumed as having an exponential distribution with average service time $T_v$;
voice requests that can be served by GSM or by UMTS: the requests are characterized by inter-arrival times that are assumed as being distributed exponentially with average arrival frequency $\lambda_{GU}$; the calls duration is also assumed as having an exponential distribution with average service time $T_v$;
data requests that can be served only by UMTS: the requests are characterized by inter-arrival times that are assumed as being distributed exponentially with average arrival frequency $\lambda_U$; the duration of the calls is also assumed as having an exponential distribution with average service time $T_d$; and data requests that can be served by UMTS or by WLAN: the requests are characterized by inter-arrival times that are assumed as being distributed exponentially with average arrival frequency $\lambda_{UW}$; the duration of the call is also assumed as having an exponential distribution with average service time $T_d$.

The four types of traffic just described are the ones that can occur in the scenario considered already presented with reference to FIG. 1.

Essentially these correspond to the presence of:

a first set of users (i.e. the GSM-only users) suited to being provided with a first service (i.e. voice) only by a first resource (i.e. the GSM network 10);

a second set of users (i.e. the GSM-UMTS users) suited to being provided:
  i) with said first service (i.e. voice) both via said first resource (i.e. the GSM network 10) and said a second resource (i.e. the UMTS network 20),
  ii) with a second service (i.e. data) both via said second resource (i.e. the UMTS network 20) and a third resource (i.e. the WLAN hot-spot 30); and a third set of users (i.e. the WLAN-only users) suited to being provided with said second service (i.e. data) only via the third resource (i.e. the WLAN hot-spot 30).

Frequently, in real cases, in fact, it is not always possible to use whatever access networks in field for each service request. This occurs above all because the areas of coverage differ in general from one access network to the other as a result of the characteristics proper to each access network (it is known, for example, that an access of a WLAN type covers only a rather limited region of territory, referred to as "hot-spot", whilst a single cell of the GSM network or else of the UMTS network is able to cover a much wider region). Another reason for which it is not always possible to choose the most suitable network in absolute terms for providing a certain service lies in the fact that the service request can come from a specific terminal that is able to use only one particular type of access (since it is not "compatible" with different standards).

Figure 4:
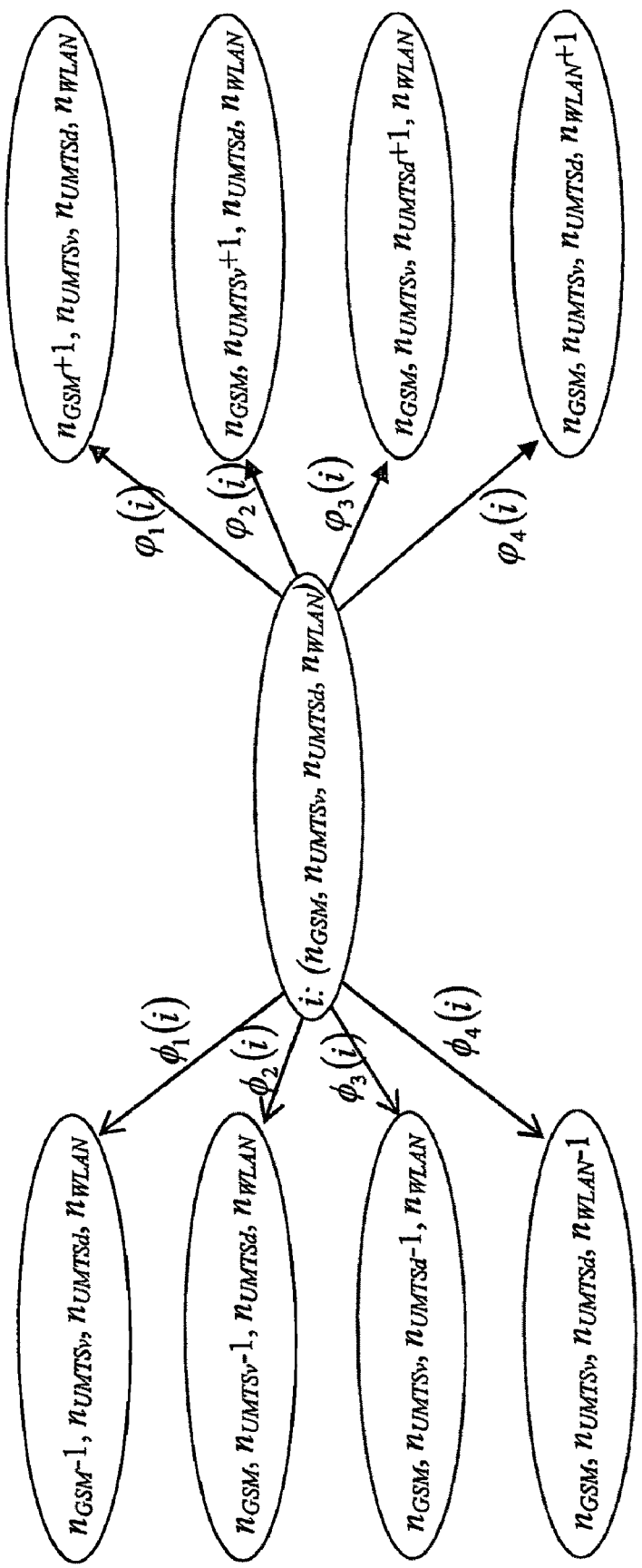
FIG. 4 shows an example of possible states of evolution of the system described herein starting from an initial state.

On these traffic hypotheses, the evolution of the system in the model with continuous-time Markov chain can be viewed, with reference to the i-th state, characterized by the quadruple "i: $(n_{GSM}, n_{UMTSv}, n_{UMTSd}, n_{WLAN})$" in the way represented in FIG. 4.

From the generic i-th state at the centre of figure, the system can then evolve towards the adjacent states represented, as a result of the termination of a service in progress, or else because the system accepts a new service request that reaches the multi-access network.

As regards the frequencies of termination of the calls/sessions—quantities $\phi(i)$—we have:

termination of a GSM voice call:

$$\phi_1(i) = \frac{n_{GSM}}{T_v}$$

termination of a UMTS voice call:

$$\phi_2(i) = \frac{n_{UMTSv}}{T_v}$$

termination of a UMTS data call:

$$\phi_3(i) = \frac{n_{UMTSd}}{T_d}$$

termination of a WLAN data call:

$$\phi_4(i) = \frac{n_{WLAN}}{T_d}$$

As regards, instead, the frequencies of acceptance of the calls/sessions—quantities $\phi(i)$—they depend not only upon the requests and the resources available, but also upon the CRRM policy implemented, which, according to the state, has the purpose of choosing to which access system to assign the service request or else to establish when it is convenient to refuse the new request.

Furthermore, on account of how the service requests are characterized, the following constraints exist on the frequencies of the transitions regarding the voice calls ($\phi_1(i)$ and $\phi_2(i)$):

the frequency of the transitions regarding voice calls served by the UMTS cannot be higher than the frequency of the requests of the voice calls that can be served by the UMTS or by the GSM:

$$\phi_2(i) \leq \lambda_{GU} \quad (1)$$

the frequency of the transitions regarding the voice calls cannot be higher than the frequency of the requests of the voice calls:

$$\phi_1(i)+\phi_2(i) \leq \lambda_{GU}+\lambda_G \quad (2)$$

Likewise, on account of the frequencies of the transitions regarding the data sessions ($\phi_3(i)$ and $\phi_4(i)$) there are the following constraints:

the frequency of the transitions regarding the data sessions served by the WLAN hot-spot cannot be higher than the frequency of the requests of the data sessions that can be served by the UMTS or by the WLAN:

$$\phi_4(i) \leq \lambda_{UW} \quad (3)$$

the frequency of the transitions regarding the data sessions cannot be higher than the frequency of the requests of the data sessions:

$$\phi_3(i)+\phi_4(i) \leq \lambda_{UW}+\lambda_W \quad (4)$$

Given the dependence of the frequencies of acceptance of the service requests upon the particular CRRM policy adopted, as long as the values of the quantities $\phi_i$ are not specified, the model so far described herein is able to represent the evolution in time of the multi-access network constituted by a GSM cell, a UMTS cell and a WLAN hot-spot, in which any CRRM policy whatsoever for assignment of the service requests is implemented. Consequently, as explained in what follows, the method proposed makes use of this mathematical representation for identifying, through an iterative method, the CRRM policy that is able to maximize the desired index of performance. Consequently, at the end of the process of identification of the optimal CRRM policy, the values of the quantities $\phi_1(i)$, $\phi_2(i)$, $\phi_3(i)$, $\phi_4(i)$ will be identified for each of the possible states (i=1, 2, . . . , N).

More in particular, the frequencies of transition $\phi_1$ and $\phi_2$ regarding the arrival of new requests of the voice service (i.e. the first type of service provided by the multiresource network), at the end of the process of identification of the optimal CRRM policy, can assume the values indicated in Table 1.

TABLE 1

| Case | $\phi_1$ | $\phi_2$ | Corresponding CRRM policy |
|---|---|---|---|
| #1 | $\phi_1 = 0$ | $\phi_2 = 0$ | GSM-only calls blocked, GSM/UMTS calls blocked. |
| #2 | $\phi_1 = 0$ | $\phi_2 = \lambda_{GU}$ | GSM-only calls blocked, GSM/UMTS calls allocated on UMTS. |
| #3 | $\phi_1 = \lambda_{GU}$ | $\phi_2 = 0$ | GSM-only calls blocked, GSM/UMTS calls allocated on GSM. |
| #4 | $\phi_1 = \lambda_G$ | $\phi_2 = 0$ | GSM-only calls allocated (on GSM), voice GSM/UMTS calls blocked. |
| #5 | $\phi_1 = \lambda_G$ | $\phi_2 = \lambda_{GU}$ | GSM-only calls allocated (on GSM), GSM/UMTS calls allocated on UMTS. |
| #6 | $\phi_1 = \lambda_G + \lambda_{GU}$ | $\phi_2 = 0$ | GSM-only calls allocated (on GSM), GSM/UMTS calls allocated on GSM. |

The frequencies of transition $\phi_3$ and $\phi_4$ regarding the arrivals of new requests for data service (i.e. the second type of service provided by the multiresource network), can, instead, assume the values indicated in the Table 2.

TABLE 2

| Case | $\phi_3$ | $\phi_4$ | Corresponding CRRM policy |
|---|---|---|---|
| #1 | $\phi_3 = 0$ | $\phi_4 = 0$ | UMTS-only data calls blocked, UMTS/WLAN data calls blocked. |
| #2 | $\phi_3 = 0$ | $\phi_4 = \lambda_{UW}$ | UMTS-only data calls blocked, UMTS/WLAN data calls allocated on WLAN. |
| #3 | $\phi_3 = \lambda_{UW}$ | $\phi_4 = 0$ | UMTS-only data calls blocked, UMTS/WLAN data calls allocated on UMTS. |
| #4 | $\phi_3 = \lambda_U$ | $\phi_4 = 0$ | UMTS-only data calls allocated (on UMTS), UMTS/WLAN data calls blocked |
| #5 | $\phi_3 = \lambda_U$ | $\phi_4 = \lambda_{UW}$ | UMTS-only data calls allocated (on UMTS), UMTS/WLAN data calls allocated on WLAN. |
| #6 | $\phi_3 = \lambda_U + \lambda_{UW}$ | $\phi_4 = 0$ | UMTS-only data calls allocated (on UMTS), UMTS/WLAN data calls allocated on UMTS. |

Described hereinafter is the behaviour in steady-state conditions of the continuous-time Markov chain.

On the hypotheses of exponential inter-arrivals and of exponentially distributed service times, it is known that the CTMC chain is homogeneous and, by resorting to the Chapman-Kolmogorov equation (used for the solution of homogeneous CTMCs), the techniques for analytical solution of the chain, i.e., the calculation of the probability $P_i$ of each state of the system in steady-state conditions, are known (for this topic see again, for example, the text of D. L. Isaacson and R. W. Madsen "Markov Chains—Theory and Applications", John Wiley & Sons, 1976, already cited previously, and in particular Chapter 7).

It is consequently possible to calculate the values $P_i$ (with i=1, . . . , N) of the probability associated to the N states of the system, through which, as described hereinafter, it is possible to determine both the probability of blocking the service requests and the mean number of users served (which is a quantity directly proportional to the revenue that can be derived from the supply of the two services considered).

There now follows a description of the possible choice of cost function to be optimized.

The identification of the optimal CRRM policy can be executed, having defined a priori a criterion of optimization (minimization of a cost or maximization of a gain). The technique proposed can then be applied once the reference cost function has been decided.

By way of example, the following two cases are considered:
 minimization of the blocking probability (cost): B,
 maximization of the revenue or profit (gain): S.

Consider as reference an i-th state characterized by the quadruple:

i: $(n_{GSM}, n_{UMTSv}, n_{UMTSd}, n_{WLAN})$

It is possible to define the blocking probability ($\beta_i$) and the revenue ($\rho_i$) associated to each state of the system in the following way:

$$\beta_i = \frac{\lambda_G + \lambda_{GU} + \lambda_U + \lambda_{UW} - (\varphi_1(i) + \varphi_2(i) + \varphi_3(i) + \varphi_4(i))}{\lambda_G + \lambda_{GU} + \lambda_U + \lambda_{UW}}$$

$$\rho_i = \xi_{GSM} \cdot n_{GSM} + \xi_{UMTSv} \cdot n_{UMTSv} + \xi_{UMTSd} \cdot n_{UMTSd} + \xi_{WLAN} \cdot n_{WLAN}$$

where $\xi_{GSM}$, $\xi_{UMTSv}$, $\xi_{UMTSd}$, $\xi_{WLAN}$, designate, respectively, the revenue associated to the provision of the individual voice service on GSM, voice service on UMTS, data service on UMTS, and data service on WLAN.

At a global level, the overall indices of performance of the CRRM policy are derived in the following way:

$$B = \sum_{i=1}^{N} P_i \beta_i \text{(mean blocking probability)}$$

and $$S = \sum_{i=1}^{N} P_i \rho_i \text{(mean revenue)}$$

By choosing either one or the other criterion of optimization, it is then possible to design the optimal CRRM policy with respect to said criterion.

It will, on the other hand, be appreciated that the cost functions identified previously correspond to just two examples of possible choice, evidently linked to normal criteria of management of telecommunication networks. It will, on the other hand, be appreciated that the invention is in no way constrained to any particular choices of cost functions.

In what follows, a technique is described that considers the optimization based upon the minimization of the blocking probability. In an altogether similar way, it is possible to consider the maximization of the revenue.

There now follows a description of the CRRM policies as alterations of the CTMC.

As mentioned previously, maintaining the constraints of Equations (1), (2), (3) and (4), the values of $\phi_j(i)$ with $j=1, \ldots, 4$ can be assigned, for each state i, depending upon the CRRM policy used. For some states, some of the $\phi_j$ will not be freely assignable, but constrained by the system itself (for example, in the proximity of the states of the system corresponding to completely occupied resources).

Consider the list of the $\phi_j(i)$ freely assignable (albeit constrained to Equations (1), (2), (3) and (4)) and let said variables be designated by $\theta_k$, with $k=1, \ldots, R$, where R is their number (obviously $R \leq N*4$).

The indices of performance B and S, or others that may be identified (for example, the total number of the calls in progress or linear combinations of the indices cited above) can be viewed as functions of the $\theta_k$.

If F designates the desired cost function (B, -S, or others), the solution of the problem $$\min_{\vartheta_1,\ldots,\vartheta_R} (F(\vartheta_1, \ldots, \vartheta_R))$$

is equivalent to identification of the best possible CRRM policy, at least on the hypothesis of expected traffic characteristics.

The search for said absolute minimum is, in general, not trivial. In practical cases, also the search for a local minimum may be sufficient for determining CRRM policies the performance of which is clearly superior respect to known methods, as will be briefly shown in the sequel of the present description.

The method described in what follows is able to find a CRRM policy with optimized performance corresponding to a local minimum by using of the gradient:

$$\frac{\partial F(\vartheta_1, \ldots, \vartheta_R)}{\partial \vartheta_i}$$

where $i=1, \ldots, R$

It is thus possible to define the vector of the gradients:

$$G(\vartheta_1, \ldots, \vartheta_R) = \left[ \frac{\partial F(\vartheta_1, \ldots, \vartheta_R)}{\partial \vartheta_1}, \frac{\partial F(\vartheta_1, \ldots, \vartheta_R)}{\partial \vartheta_2}, \ldots, \frac{\partial F(\vartheta_1, \ldots, \vartheta_R)}{\partial \vartheta_R} \right]$$

There now follows a description of the technique of optimization of the CRRM policies based upon the gradient of the cost function.

Starting from a gradient vector $G(\theta_1, \ldots, \theta_R)$ defined in what follows, described here is an iterative method for optimizing the CRRM policy once the desired index of performance (blocking probability or revenue) has been chosen. To optimize the CRRM policy for allocation of the services, it is necessary to calculate a vector $\Theta = (\theta_1, \ldots, \theta_R)$ in such a way as to minimize the cost function F.

Figure 6:
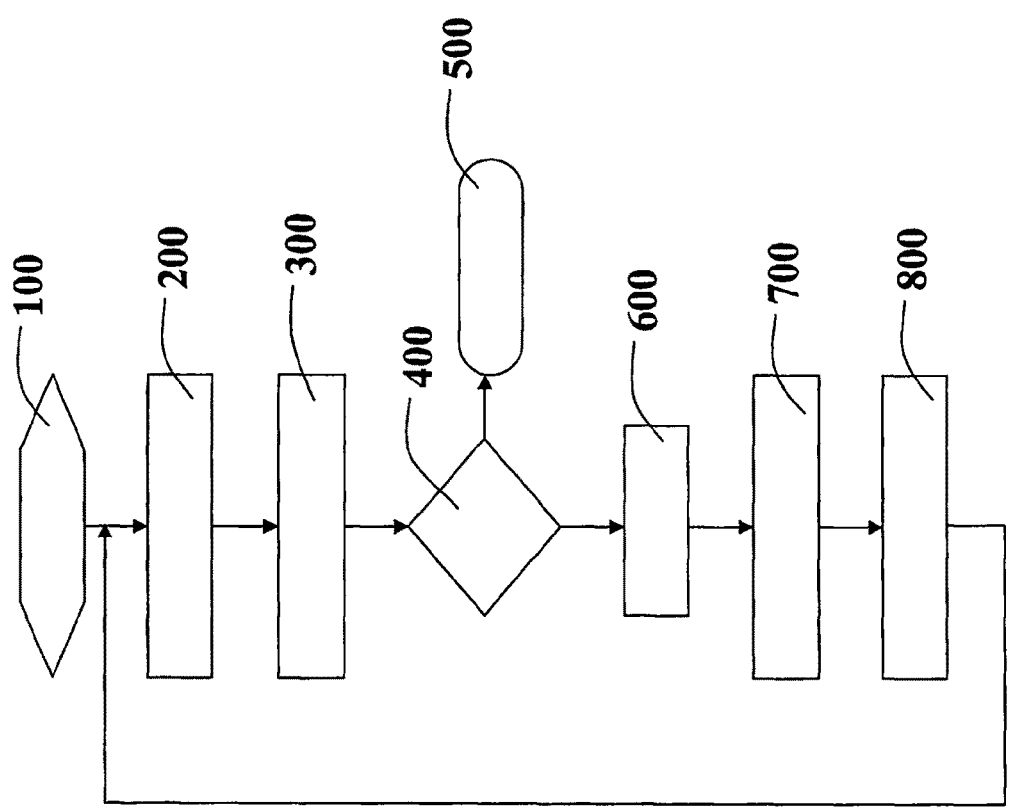
FIG. 6 shows an example of flowchart of the solution described herein.

FIG. 6 shows the flowchart of the proposed optimization technique.

Identified in a step 100 is a possible initial starting solution which is assigned to the vector $\Theta = (\theta_1, \ldots, \theta_R)$.

Usually this starting solution is chosen in such a way as to correspond already to a sub-optimal solution of the problem, identified for example by resorting to known analytical techniques or to heuristic criteria of "common sense", such as the "simple policy" to which reference will be made in what follows.

In a step 200 the gradient of the cost function (vector G) is calculated as a function of $\Theta$.

In a step 300, there are identified the set $C_{min}$ of the indices of the components of the vector $\Theta$, which are candidates for being reduced to their minimum value, and the set $C_{max}$ of the indices of the components of the vector $\Theta$, which are candidates for being increased to their maximum value, namely:

$$C_{min} = \{i | G_i(\Theta) > 0 \wedge \theta_i > \theta_{i\,min}\}$$

$$C_{max} = \{i | G_i(\Theta) < 0 \wedge \theta_i < \theta_{i\,max}\}$$

In terms of operation it means identifying, on the Markov chain that describes the system with some degrees of freedom, the transitions that are still "free" which can be suppressed or entered respectively. Let $C_x$ be the union of the components identified, namely:

$C_x = C_{min} \cup C_{max}$

In a step 400, a check is made to see whether $C_x$ is empty.

If so, in a step 500, the technique has found an optimal solution (defined by the vector $\Theta$), and the process terminates.

If not, in a step 600, the value $$\overset{\prime}{G} = \max_{i \in C_x}(|G_i|)$$

of the maximum in absolute value between the components of the vector G chosen from the indices $C_x$ is considered.

Identified in a step 700 is the subset $C'_{min} \subset C_{min}$ of the indices of the components of $\Theta$ for which the gradient of the cost function is at least 10% of $\overset{\prime}{G}$ (10% is considered an empirical value to achieve good results; a value that is too low slows down too much the numerical calculation; a value that is too high risks the loss of good solutions).

$$C'_{min} = \left\{ i \,\middle|\, i \in C_{min} \wedge |G_i| \geq \frac{1}{10} \overset{\prime}{G} \right\}$$

The subset $C'_{max} \subset C_{max}$ of the indices of the components of $\Theta$ for which the gradient of the cost function is at least 10% of $\overset{\prime}{G}$ is then identified.

$$C'_{max} = \left\{ i \,\middle|\, i \in C_{max} \wedge |G_i| \geq \frac{1}{10} \overset{\prime}{G} \right\}$$

Assigned to the components identified in $C'_{min}$ is the minimum value admissible (i.e. zero); assigned to the components identified in $C'_{max}$ is the maximum value admissible (refer to the previous reported Table 1 and Table 2).

$$\forall i = 1 \ldots R : \vartheta'_i = \begin{cases} \vartheta_i & i \notin C'_{min} \wedge i \notin C'_{max} \\ \vartheta_{i\,min} & i \in C'_{min} \\ \vartheta_{i\,max} & i \in C'_{max} \end{cases}$$

Finally, in a step 800 and with the new values of $\Theta$ $\forall i=1, \ldots, R: \theta_i = \theta'_i$, we return to step 200.

The solutions thus identified define (according to the criteria exemplified in Tables 1 and 2 above) the policy of management of the multi-access network.

In order to evaluate the performance of the methods proposed, as initial solution referred to in step 100 of the flowchart of FIG. 6, the choice has been to use the elementary CRRM policy, referred to in what follows as "simple policy", proceeding in the following way:

upon arrival of a voice request that can be allocated only in the GSM cell, said request is assigned to said system if there are resources available; otherwise, it is blocked;

upon arrival of a voice request that can be allocated on the GSM cell or on the UMTS cell, said request is preferentially assigned to the GSM and, in the case of unavailability of GSM resources, on the UMTS; in the case where there are no resources available on both of the systems, the request is blocked;

upon arrival of a data request that can be allocated only on the cell of the UMTS system, said request is assigned to said system if there are resources available; otherwise, it is blocked;

upon arrival of a data request that can be allocated on the cell of the UMTS system or on the WLAN hot-spot, said request is preferentially assigned to the WLAN system and, in the case of unavailability of WLAN resources, on the UMTS; in the case where there are no resources available on both of the systems, the request is blocked.

The simple policy hence envisages assigns a voice request preferably on the GSM and, as a second choice, if possible, on the UMTS; likewise, a data request is preferably assigned on the WLAN and, as a second choice, if possible, on the UMTS.

Illustrated in what follows are the values considered in the example for generating an optimized method and evaluating its performance with respect to the initial simple policy:

| | | |
|---|---|---|
| GSMcap | 20 | GSM capacity (num. of voice circuits), |
| Vul | 12.2 | Uplink voice bit rate (kbit/s), |
| Vdl | 12.2 | Downlink voice bit rate (kbit/s), |
| Av | * | Voice traffic [Erl], |
| Ad | * | Data traffic (number of connections simultaneously active), |
| DRul | 128 | Uplink data rate (kbit/s), |
| DRdl | 384 | Downlink data rate (kbit/s), |
| WLANcap | 10 | WLAN capacity, |
| $\xi_{GSM}$ | 1 | Voice-call revenue on GSM, |
| $\xi_{UMTSv}$ | 1 | Voice-call revenue on UMTS, |
| $\xi_{UMTSd}$ | 5 | Data-connection revenue on UMTS, |
| $\xi_{WLAN}$ | 5 | Data-connection revenue on WLAN, |
| p | * | Probability that the voice calls can use only GSM, |
| q | * | Probability that the data connection can use only UMTS, |
| TservV | * | Mean duration of voice service [s], |
| TservD | * | Mean duration of data service [s], |
| Optimization | * | Criterion of optimization (blocking probability or revenue). |

Where a numerical value is indicated, this means that the value is assumed always as the one specified. In the other cases, distinguished by "*", the value will be specified each time, even resorting, if necessary, to the following compact notation:

p/q/Av/Ad/TservV/TservD to specify completely the conditions on which the method has been generated and evaluated (the criterion of optimization, according to blocking probability or according to revenue, will be specified separately).

For example, the point 0/0/34/7/120/120 will indicate the following conditions:

| | | |
|---|---|---|
| GSMcap | 20 | GSM capacity (num. of voice circuits), |
| Vul | 12.2 | Uplink voice bit rate (kbit/s,) |
| Vdl | 12.2 | Downlink voice bit rate (kbit/s), |
| Av | 34 | Voice traffic [Erl], |
| Ad | 7 | Data traffic (number of connections simultaneously active), |
| DRul | 128 | Uplink data rate (kbit/s), |
| DRdl | 384 | Downlink data rate (kbit/s), |
| WLANcap | 10 | WLAN capacity, |
| $\xi_{GSM}$ | 1 | Voice-call revenue on GSM, |
| $\xi_{UMTSv}$ | 1 | Voice-call revenue on UMTS, |
| $\xi_{UMTSd}$ | 5 | Data-call revenue on UMTS, |
| $\xi_{WLAN}$ | 5 | Data-call revenue on WLAN, |
| p | 0 | Probability that the voice call is only GSM, |
| q | 0 | Probability that the data call is only UMTS, |
| TservV | 120 | Mean duration of voice service [s], |
| TservD | 120 | Mean duration of data service [s], |
| Optimization | * | Criterion of optimization blocking probability or revenue). |

Figure 7:
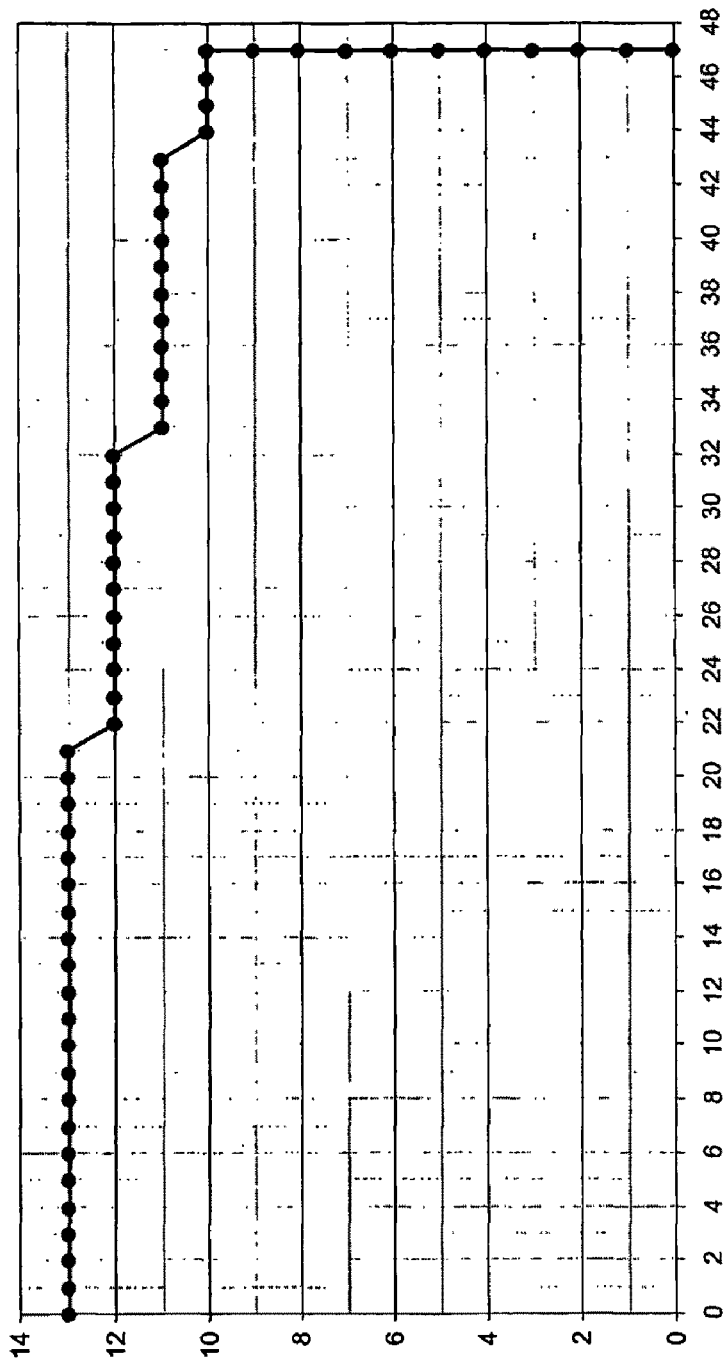
FIG. 7 shows an example of capacity region used for the evaluation of the performance of the method described herein.

Furthermore, the region of capacity illustrated in FIG. 7 has been considered.

Figure 8:
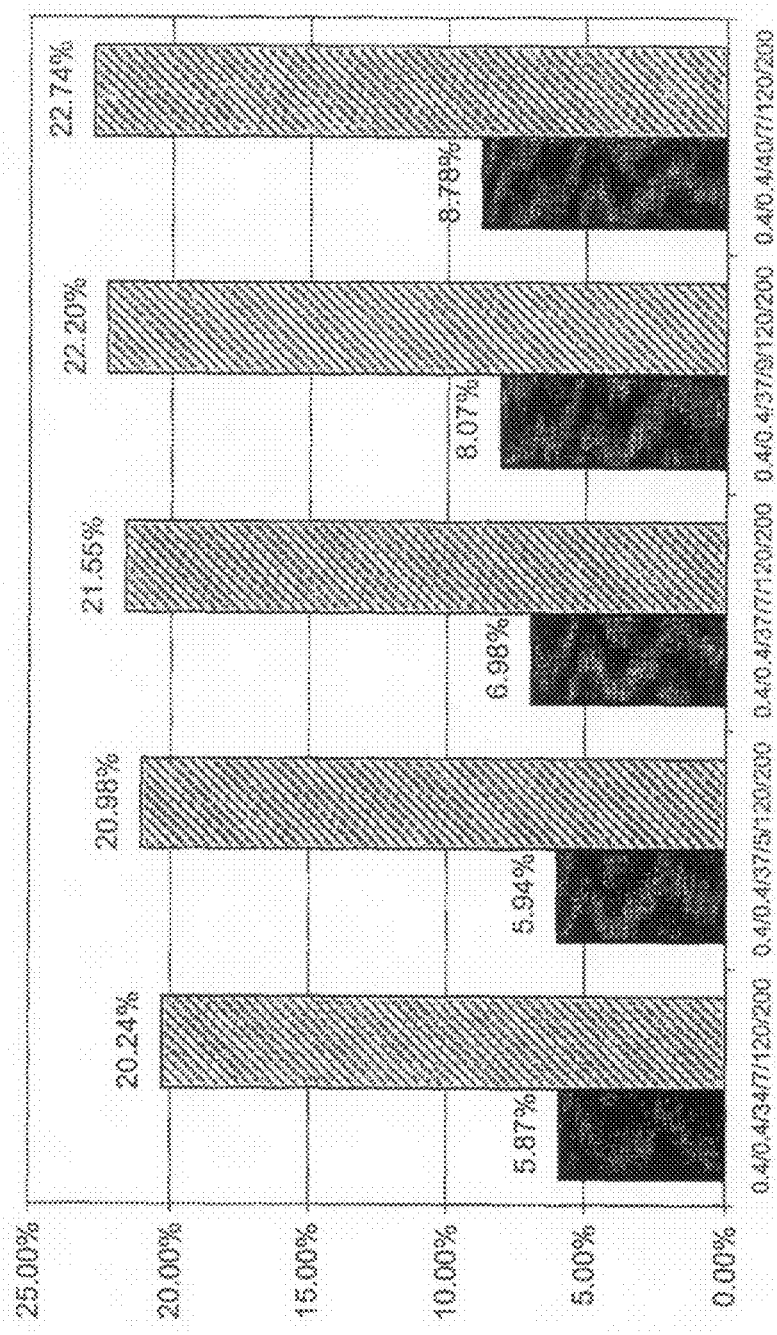
FIG. 8 shows a comparison of performance in the case where the method is optimized so as to minimize the blocking probability.

FIG. 8 shows the comparison of the performance of the optimized CRRM policy for the blocking probability with that of the simple policy.

The graph shows how, using the CRRM policy obtained through the proposed method, it is possible to obtain probabilities of blocking of the service requests that are considerably lower than the ones corresponding to the starting simple policy.

Figure 9:
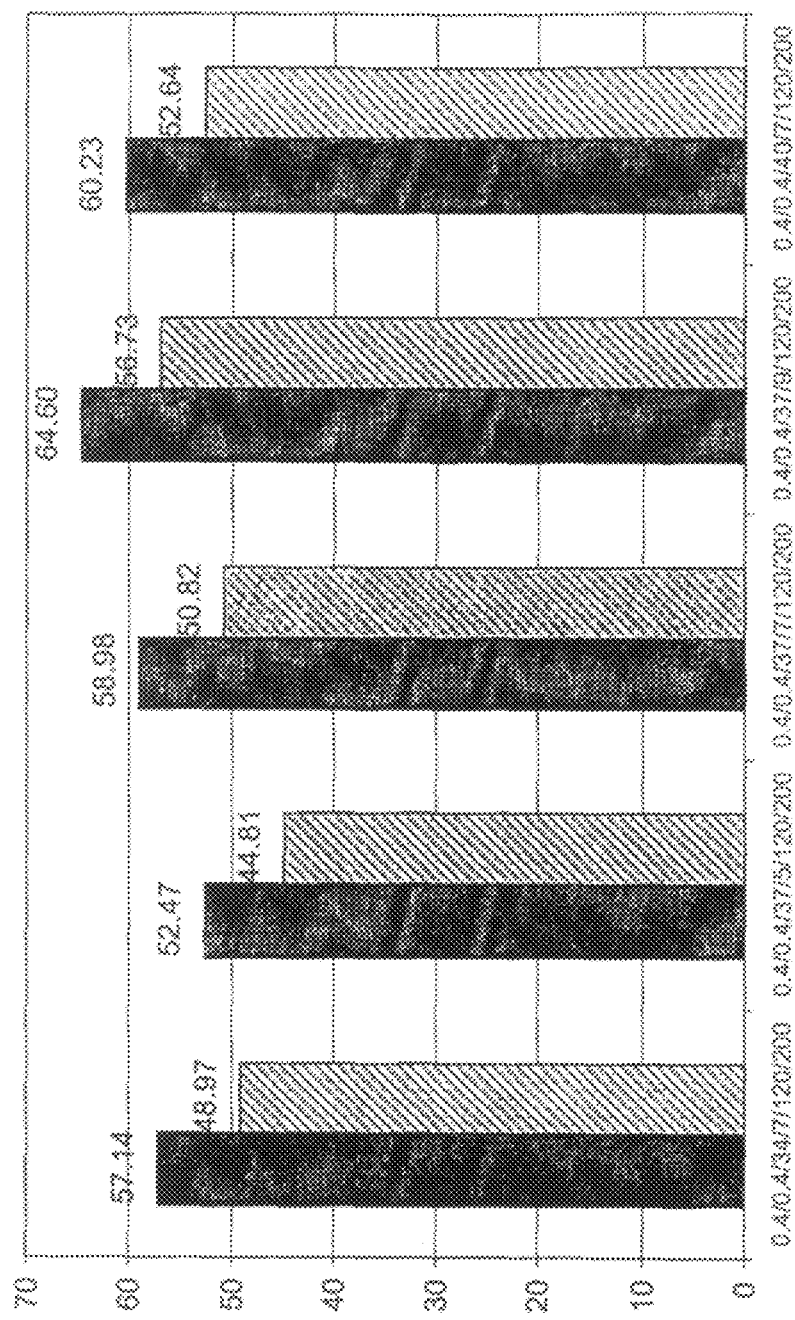
FIG. 9 shows a comparison of performance in the case where the method is optimized so as to maximize revenue.

As regards the CRRM policy optimized for revenue see FIG. 9.

The graph shows that also using the CRRM policy optimized for revenue, an all-round better performance is obtained. Both the blocking probability and hence the revenue are markedly better than what can be obtained through the elementary reference policy.

Since a generic CRRM policy is called upon to manage the radio resources at the level of individual cells of the different access segments, the description of the proposed method is limited to considering just one cell for each of the access networks present.

This is in no way prejudicial to the possibility of applying the method in a more general context. To define a CRRM policy valid for an entire portion of a multi-access network, that regards a specific region of territory, in fact, it is simply necessary to take into consideration the different cells present in the region of territory considered, analysing what relation exists between the cells of the different access networks that cover portions of territory jointly. From the mean distribution of the traffic over all the specific region of territory considered and from the configuration of the radio resources of the cells, it is then possible to derive the frequency of the service requests that can be managed by one or more of the access networks.

The method proposed has been illustrated considering the access networks GSM and UMTS and a WLAN hot-spot. The method is in any case applicable in the case where there is present a different number of access networks and/or access networks of a different type. In fact, the method in itself is not based upon any specific mechanism of the access systems considered, but takes into consideration only the maximum number of users that can be managed with the radio resources available. It is therefore sufficient that the various systems involved should envisage (in a direct or else indirect way) a maximum limit to the number of users of a given service that can be managed with the radio resources available. This occurs in all the real cases in which, in general, the various mobile-radio systems can avail themselves of a necessarily limited amount of radio resources. According to the specific standard considered, the limit will be determined by the particular techniques of transmission adopted and by the corresponding practical factors involved.

It is known, for example, that each cell of the GSM system has a maximum number of voice circuits, identified during the sizing of the system, whilst in the UMTS system said limit can be due, according to the cases, either to the maximum amount of interference that the system is able to manage with the powers available or to the code number that can be used to identify each user. In other systems, for example in the case of an area served by a hot-spot of a WLAN type, the maximum number of users for a given service could be determined on the basis of the minimum level of quality of service that it is intended to offer to the users (establishing, for example, a minimum limit for the throughput of the data that it is intended to offer to each of the users present, or else a limit to the tolerable transfer delays).

The method has been illustrated with reference to a system in which two services (voice and data) are envisaged, which give rise to four types of requests (voice only on GSM, voice on GSM or UMTS, data only on UMTS, data on UMTS or WLAN). It may, however, be extended in a similar way to a generic case, with an arbitrary number of types of services and requests of various types.

Also the method for optimizing the cost function can be replaced by similar methods (for example, by setting the threshold of step 700 to 5%), without changing substantially the logic followed by the method. In this sense, for example, further conditions (for instance, by stopping the process of optimization when the cost function does no longer vary significantly) in order to evaluate the conditions of termination of the iterative process can be used instead of what has been described, without altering the logic of the method illustrated.

The method described herein at a high level through the flowchart of FIG. 6 can be conveniently implemented and translated into any language suitable for its automatic execution (for example, using the well-known Matlab™ tool. In turn, the policy of resource allocation generated by the method can be implemented within the microprocessors present in the network devices that manage the radio resources of the systems present.

The sequence of operations described, aimed at identifying an optimal policy of management of a multi-resource network, can be executed periodically and/or at time intervals identified in such a way as to correspond to different conditions of operation of the network, for example according to various traffic conditions.

Consequently, without prejudice to the underlying principles of the invention, the details and the embodiments may vary, even appreciably, with respect to what has been described by way of example only, without departing from the scope of the invention as defined by the annexed claims.

The invention claimed is:

1. A method of controlling, in a multi-access communication network, the provision of services to users by means of radio resources of said multi-access communication network, comprising the steps of:
   modelling a system made up of said radio resources of said multi-access communication network as a Markov chain, wherein said Markov chain comprises states and transitions between states, and wherein each state of said Markov chain is identified by a respective set of values, each set of values being representative of a number of users served by each of said radio resources, and each transition between said states of said Markov chain being represented by allocation and de-allocation to said users of the services provided by said radio resources;
   defining a cost function to which each of said states gives a contribution, each of said contributions being weighted by the probability that said system is in said each state, where said probability is a function of the possible transitions between said states;
   identifying a plurality of transitions between said states that optimizes said cost function; and
   allocating said radio resources to said users according to said plurality of transitions.

2. The method of claim 1, comprising the step of selecting said cost function as an indicator of blocking probability of said multi-access communication network, wherein said plurality of transitions between said states that optimizes said cost function comprises the transitions that minimize said blocking probability.

3. The method of claim 2, comprising the step of optimizing said cost function by identifying a minimum point thereof.

4. The method of claim 1, comprising the step of selecting said cost function as an indicator of the revenue of providing said services to said users, whereby said plurality of transitions between said states that optimizes said cost function comprises the transition that maximizes said revenue indicator.

5. The method of claim 4, comprising the step of optimizing said cost function by identifying a maximum point thereof 6. The method of claim 1, comprising the steps of:
   identifying a starting plurality of transitions between said states corresponding to a given policy of allocation and de-allocation of said radio resources to said users; and
   identifying the plurality transitions between said states that optimizes said cost function starting from said starting plurality of transitions between said states.

7. The method of claim 1, wherein said multi-access communication network comprises at least a first, a second and a third network, said first network being a second-generation mobile network, said second network being a third-generation mobile network and said third network being a local network.

8. The method of claim 7, wherein coverage of said third-generation communication network is a subset of the coverage of said second-generation mobile communication network.

9. The method of claim 7, wherein the coverage of said local network is a subset of the coverage of said third-generation mobile network.

10. The method of claim 7, wherein said users comprise:
    a first set of users suited to being provided with a first service only via said first network;

a second set of users suited to being provided with said first service both via said first network and said second network;

a third set of users suited to being provided with said second service only via said second network; and a fourth set of users suited to being provided with said second service both via said second network and said third network.

11. The method of claim 10, wherein said first service is a voice service and said second service is a data service.

12. The method of claim 11, wherein said transitions comprise:

a new request for said first service from said first and second set of users being blocked;

a new request for said first service from said first set of users being blocked and a new request for said first service from said second set of users being allocated on said second network;

a new request for said first service from said first set of users being blocked and a new request for said first service from said second set of users being allocated on said first network;

a new request for said first service from said first set of users being allocated on said first network, and a new request for said first service from said second set of users being blocked;

a new request for said first service from said first set of users being allocated on said first network, and a new request for said first service from said second set of users being allocated on said second network; and a new request for said first service from said first set of users being allocated on said first network, and a new request for said first service from said second set of users being allocated on said first network.

13. The method of claim 12, wherein said transitions comprise:

a new request for said second service from said second and third set of users being blocked;

a new request for said second service from said third set of users being blocked and a new request for said second service from said second set of users being allocated on said third network;

a new request for said second service from said third set of users being blocked and a new request for said second service from said second set of users being allocated on said second network;

a new request for said second service from said third set of users being allocated on said third network and a new request for said second service from said second set of users being blocked;

a new request for said second service from said third set of users being allocated on said third network and a new request for said second service from said second set of users being allocated on said third network; and a new request for said second service from said third set of users being allocated on said third network and a new request for said second service from said second set of users being allocated on said second network.

14. A system for controlling, in a multi-access communication network, the provision of services to the users by the radio resources of said multi-access communication network, comprising a configuration for performing the method of claim 1.

15. A multi-access communication network comprising at least one system according to claim 14.

16. The network of claim 15, wherein said system is distributed over control devices associated with said network.

17. The network of claim 15, wherein said system is located at a server entity, the network comprising interfaces for interfacing said centralized server with said network.

18. A non-transitory computer-readable medium encoded with a computer program product, loadable into a memory of at least one computer and comprising software-code portions for performing the method of claim 1.

* * * * *

UNITED STATES PATENT AND TRADEMARK OFFICE
CERTIFICATE OF CORRECTION

PATENT NO. : 8,339,946 B2
APPLICATION NO. : 11/922923
DATED : December 25, 2012
INVENTOR(S) : Barbaresi et al.

It is certified that error appears in the above-identified patent and that said Letters Patent is hereby corrected as shown below:

In the Claims:

Claim 1, col. 18, lines 5-27,

"1. A method of controlling, in a multi-access communication network, the provision of services to users by means of radio resources of said multi-access communication network, comprising the steps of:
modelling a system made up of said radio resources of said multi-access communication network as a Markov chain, wherein said Markov chain comprises states and transitions between states, and wherein each state of said Markov chain is identified by a respective set of values, each set of values being representative of a number of users served by each of said radio resources, and each transition between said states of said Markov chain being represented by allocation and de-allocation to said users of the services provided by said radio resources;
defining a cost function to which each of said states gives a contribution, each of said contributions being weighted by the probability that said system is in said each state, where said probability is a function of the possible transitions between said states;
identifying a plurality of transitions between said states that, optimizes said cost function; and
allocating said radio resources to said users according to said plurality of transitions."

should have been amended to read as

--1. A method of controlling radio resources in a multi-access communication network comprising a plurality of radio access networks each configured to handle one or more predetermined types of service requests from users, the method comprising the steps of:

Signed and Sealed this
Twenty-eighth Day of May, 2013

Teresa Stanek Rea
*Acting Director of the United States Patent and Trademark Office* modeling a system made up of said radio resources of said plurality of radio access networks as a Markov chain, wherein said Markov chain comprises states and transitions between states, and wherein each state of said Markov chain is identified by a respective set of values, each set of values being representative of a number of users served by each of said radio resources, and each transition between said states of said Markov chain being represented by allocation and de-allocation of said service requests to said radio resources of said plurality of radio access networks;

defining a cost function to which each of said states gives a contribution, each of said contributions being weighted by the probability that said system is in said each state, where said probability is a function of the possible transitions between said states;

identifying a plurality of transitions between said states that optimizes said cost function; and allocating said service requests from said users to said radio resources of said plurality of radio access networks according to said plurality of transitions. --.

Claim 5, col. 18, line 44, "thereof" should read -- thereof. --.

UNITED STATES PATENT AND TRADEMARK OFFICE
CERTIFICATE OF CORRECTION

| | | |
|---|---|---|
| PATENT NO. | : 8,339,946 B2 | Page 1 of 1 |
| APPLICATION NO. | : 11/922923 | |
| DATED | : December 25, 2012 | |
| INVENTOR(S) | : Barbaresi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 743 days.

Signed and Sealed this
Eighth Day of July, 2014

Michelle K. Lee
*Deputy Director of the United States Patent and Trademark Office*